United States Patent [19]
Barraclough et al.

[11] Patent Number: 5,526,354
[45] Date of Patent: Jun. 11, 1996

[54] PACKET COMMUNICATION TERMINAL HAVING SYNCHRONIZED AUDIO AND CURSOR DATA

[75] Inventors: Keith R. Barraclough, Romsey; Adrian C. Gay, Fareham, both of United Kingdom

[73] Assignee: International Business Machines Corporation, Armonk, N.Y.

[21] Appl. No.: 261,548

[22] Filed: Jun. 17, 1994

[51] Int. Cl.[6] .................................. H04J 3/26; H04M 3/42
[52] U.S. Cl. .................................. 370/62; 370/94.2; 345/2; 379/202
[58] Field of Search .................................. 370/62, 110.1, 370/60, 60.1, 94.1, 94.2; 345/1, 2; 379/100, 106, 157, 158, 201, 202

[56] References Cited

U.S. PATENT DOCUMENTS 4,769,833  9/1988  Farleigh et al. .................. 370/60.1 X
5,392,400  2/1995  Berkowitz et al. .................. 395/200
5,408,470  4/1995  Rothrock et al. .................. 370/62

*Primary Examiner*—Melvin Marcelo
*Attorney, Agent, or Firm*—Richard M. Ludwin; Ronald L. Drumheller

[57] ABSTRACT

The present invention relates a communication terminal for the synchronization of audio and visual information within a communication system. Audio communication between the parties to a video conference is achieved by digitizing the speech and transmitting the same over a packet based data network. Each party to the conference can draw the attention of the other party to an object on the screen using a pointer controlled by, say, a mouse or ball. The co-ordinates of each parties' pointer are incorporated, via a multiplexer, into the data packets containing the digitized speech and transmitted to the other party's terminal thereby ensuring the synchronization the pointer information with the digitized speech.

12 Claims, 2 Drawing Sheets

PACKET COMMUNICATION TERMINAL HAVING SYNCHRONIZED AUDIO AND CURSOR DATA

BACKGROUND OF THE INVENTION a. Field of the Invention

The present invention relates to a communication terminal for use in a communication or video conferencing system.

b. Related Art

Video conferencing systems facilitate interactive collaborative working between individuals at different locations using computers as a communication tool. Within conventional video conferencing systems, the users may have separate data and audio links. Data relating to the application upon which the users are collaboratively working in conjunction with visual data, representing the images of the parties, are exchanged via a packet based data network. The audio and data links are conventionally established using a telephone network and packet based data network respectively.

The interactions involved during collaborative working may relate to, for example, discussing the financial planning aspects of a project; for which the parties have a financial model and manipulate using, say, a spread sheet on a chalk board in the conventional manner. Each party would have a copy of the relevant financial model on the screen of their communication terminal or video conferencing terminal. However, only one party will have total control over the operation of the model, that is, only one party will be able to effect changes to the model. Discussions and interactions take place using the data and audio links. An addressor draws the attention of an addressee to a particular aspect of the model using a pointer controlled by, say, a mouse or other suitable input device.

The pointers of both parties are displayed on both terminal screens simultaneously. The simultaneous display of the pointers on the screens of both parties is effected by exchanging pointer location co-ordinates over the packet based data network. The packet based data network can be either switched or non-switched. In order that the parties to the conference perceive the system as being real-time and as having an interactive feeling the pointer location co-ordinates need to be exchanged approximately fifteen to twenty-five times per second.

The exchange of co-ordinates in existing systems is also usually effected via the packet based data network. This is to be contrasted with the exchange of audio information via a telephone network. Referring to the latter, the communication is almost instantaneous whereas with the former there is invariably an end-to-end delay or network latency. Consequently, a scenario can be envisaged in which an addressor attempts to draw the attention of an addressee to a particular aspect of the model using their pointer while simultaneously articulating "Look at this" and, due to network latency, the new pointer co-ordinates corresponding to current pointer location of the addressor's terminal at the time of the articulation will not have reached the addressee's terminal. This will have the effect of drawing the addressee's attention to whatever aspect of the model the addressor's old pointer location co-ordinates were indicating thereby introducing scope for misunderstanding between the parties.

SUMMARY OF THE INVENTION

An object of the present invention is to provide a video conferencing terminal which mitigates the problems of prior art terminals.

According to a first aspect of the present invention there is provided a transmitting communication terminal comprising display means, means for generating digital audio data units, an input means, means responsive to said input means for generating pointer location data units and means for transmitting a data packet over a packet based data network to a remote terminal, said terminal being characterised by: means for presenting to a multiplexer said digital audio and pointer location data units; and means for multiplexing said presented digital audio and pointer location data units into the same data packet thereby forming a composite data packet for transmission over said packet based data network.

In order to effectively utilise the above composite data packet a suitable receiving terminal would be required.

Accordingly, in a second embodiment of the present invention there is provided a receiving communication terminal comprising display means and being characterised by: means for receiving over a packet based data network from a remote terminal a composite data packet comprising multiplexed digital audio and pointer location data units; means for demultiplexing said received composite data packet into separate digital audio and pointer location data units; means for presenting said demultiplexed pointer location and digital audio data units to said display means and a speech synthesis means respectively; means for utilising said presented pointer location and digital audio data units to display a pointer reflecting the current location of a pointer on the display means of said remote terminal and to generate speech via said speech synthesis means thereby substantially synchronising the display of said pointer with the output of said digital audio from said remote terminal.

It will be appreciated that a more economically viable embodiment of the present invention would be realised if the transmitting and receiving terminals above are combined into a single terminal.

Appropriately, in a third embodiment of the present invention there is provided a communication terminal comprising display means, means for generating digital audio data units, an input means, means responsive to said input means for generating pointer location data units and means for transmitting a data packet over a packet based data network to a remote terminal, said terminal being characterised by: means for presenting to a multiplexer said digital audio and pointer location data units; means for multiplexing said presented digital audio and pointer location data units into the same data packet thereby forming a composite data packet for transmission over said packet based data network; means for receiving over said packet based data network from said remote terminal a composite data packet comprising multiplexed digital audio and pointer location data units; means for demultiplexing said received composite data packet into separate digital audio and pointer location data units; means for presenting said demultiplexed pointer location and digital audio data units to said display means and a speech synthesis means respectively; and means for utilising said presented pointer location and digital audio data units to display a pointer reflecting the current location of a pointer on the display means of said remote terminal and to generate speech via said speech synthesis means thereby substantially synchronising the display of said pointer with the output of said digital audio from said remote terminal.

In accordance with another aspect of the present invention there is provided a method of communicating sound and associated pointer information comprising the steps of generating digitised audio data units from the sound to be transmitted, generating pointer location data units representing the physical location of a pointer, said method being characterised by the steps of: presenting to a multiplexer said digital audio and pointer location data units; and multiplexing said presented digital audio and pointer location data units into the same data packet thereby forming a composite data packet for transmission over a packet based data network.

In accordance with a still further aspect of the present invention there is provided a method of communicating sound and associated pointer information, said method being characterised by the steps of: receiving over a packet based data network from a remote terminal a composite data packet comprising multiplexed digital audio representing sound transmitted from said remote terminal and pointer location data units representing the physical location of a pointer on said remote terminal; demultiplexing said received composite data packet into separate digital audio and pointer location data units; presenting said demultiplexed pointer location and digital audio data units to a display means and a speech synthesis means respectively; and utilising said presented pointer location and digital audio data units to display a pointer reflecting the current location of a pointer on the display means of said remote terminal and to generate speech via said speech synthesis means thereby substantially synchronising the display of said pointer with the output of said digital audio from said remote terminal.

In accordance with a yet further aspect of the present invention there is provided a method of communicating sound and associated pointer information comprising the steps of generating digitised audio data units from the sound to be transmitted, generating pointer location data units representing the physical location of a pointer, said method being characterised by the steps of: presenting to a multiplexer said digital audio and pointer location data units; multiplexing said presented digital audio and pointer location data units into the same data packet thereby forming a composite data packet for transmission over a packet based data network, receiving over said packet based data network from a remote terminal a composite data packet comprising multiplexed digital audio and pointer location data units; demultiplexing said received composite data packet into separate digital audio and pointer location data units; presenting said demultiplexed pointer location and digital audio data units to said display means and a speech synthesis means respectively; and utilising said presented pointer location and digital audio data units to display a pointer reflecting the current location of a pointer on the display means of said remote terminal and to generate speech via said speech synthesis means thereby substantially synchronising the display of said pointer with the output of said digital audio from said remote terminal.

BRIEF DESCRIPTION OF THE DRAWING

An embodiment of the present invention will be described, with reference to the accompanying drawing in which.

DETAILED DESCRIPTION OF THE PREFERRED EMBODIMENTS

Figure 1:
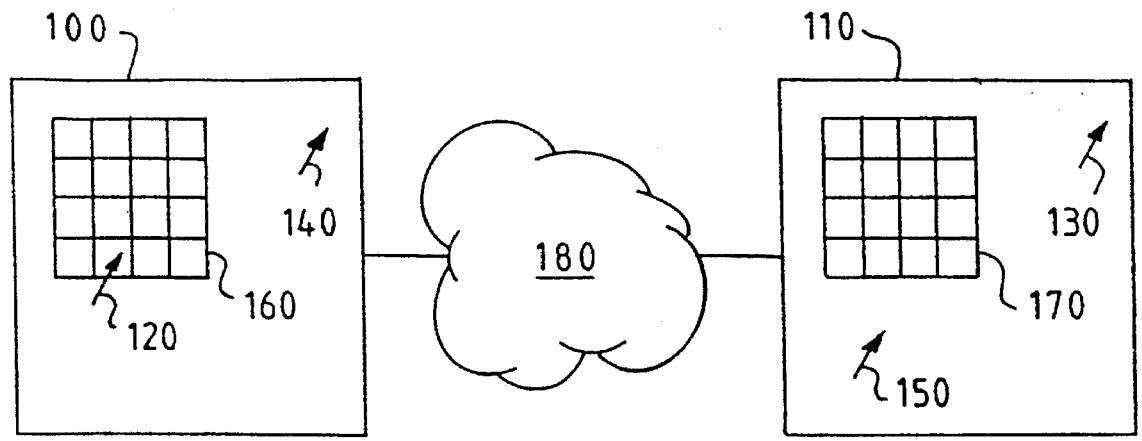
FIG. 1 shows schematically the displays of two communication terminals as utilised in a communication system according to the prior art.

In FIG. 1 there are shown schematically two communication terminal displays, 100 and 110, as utilised in a communication system or video conferencing system. It can be seen that each display contains a pointer, 120 and 130, and a copy of the other party's terminal pointer, 150 and 140, and a copy of, say, a spread sheet, 160 and 170, on a chalk board, with which the parties are collaboratively working. Each communication terminal is connected to a packet based data network 180. Due to network latency, a pointer 120 of one terminal and the copy of the same 150 on the other terminal are or can be at different locations.

Figure 2:
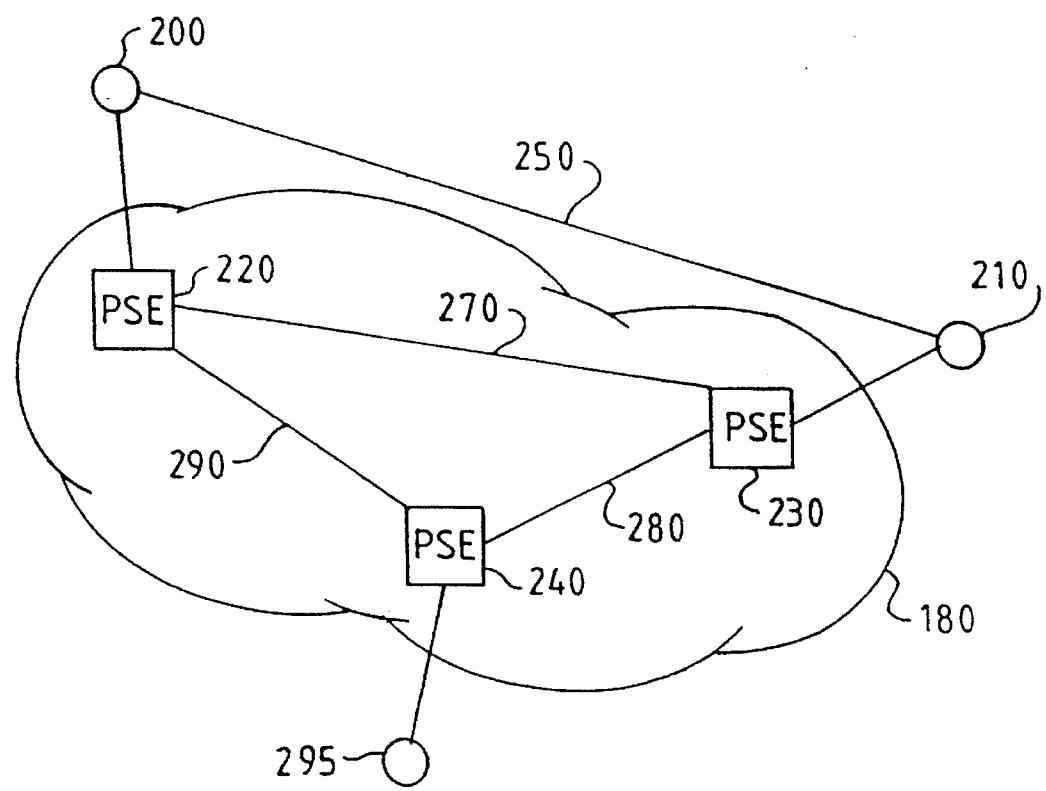
FIG. 2 shows schematically a communication system according to the prior art.

Referring to FIG. 2 there is schematically shown a video conferencing system according to the prior art. The users of the communication terminals 200 and 210 exchange data via the packet based data network 180 in the conventional manner. Each communication terminal, 200 210 and 295, is, in the case of a switched network, connected to the packet based data network 180 via a packet switching exchange such as 220, 230 or 240. It can be seen that communication terminals 200 and 210 are utilising packet switching exchanges 220 and 230.

Within a packet based data network 180 there maybe no physical connections established through the network between terminals attached thereto. Consequently, all data exchanged between terminals 200 and 210 are assembled into packets containing both source and destination addresses and routed accordingly in the conventional manner. Each packet is submitted to the packet based data network 180 via the packet switching exchange to which a particular terminal is attached.

A packet switching exchange conventionally contains a routing directory indicating the outgoing links 270 280 290 utilised by each network address. On receiving each packet, the packet switching exchange forwards that packet on an appropriate link in the usual store and forward manner. Consequently, it is conceivable that during a communication between the users of terminals 200 and 210 some packets will be routed via exchange 240 while others will be routed more directly. Consequently, additional delays can be incurred.

Notwithstanding an embodiment of the present invention described herein referring to a packet switched data network, the present invention is not limited thereto. It can equally well be realised using a non-switched data network such as a local area network.

A telephone line is conventionally used to provide audio communication between the collaborative parties. It is evident that a relatively high transmission delay may be encountered in forwarding each data packet as compared to an audio exchange via the telephone link 250. Therefore, the situation can arise in which an addressor attempts to draw the attention of an addressee to a particular aspect of the model by directing his pointer to that aspect whilst simultaneously articulating, for example, "Look at this". The oral communication will be virtually instantaneous at which time the addressee will examine the item on their screen currently indicated by the copy of the addressor's pointer which may not necessarily be at the most up-to-date location.

Prior art video conferencing systems exist in which the audio link is supported by digitising the audio according to conventional techniques, such as CCITT Recommendation G.711, and assembling the digitised audio into packets suitable for transmission over the packet based data network. The audio packets and other data packets being transmitted over the packet based data network separately. Therefore, due to the transmission and routing techniques employed by some packet based data networks, a further situation can be envisaged wherein the audio data packets, containing the digitised articulation "Look at this", arrive a relatively considerable period of time before or after the data packet containing the pointer co-ordinates. Accordingly, inherent scope for misunderstanding between the parties is again possible.

Figures 3, 4:
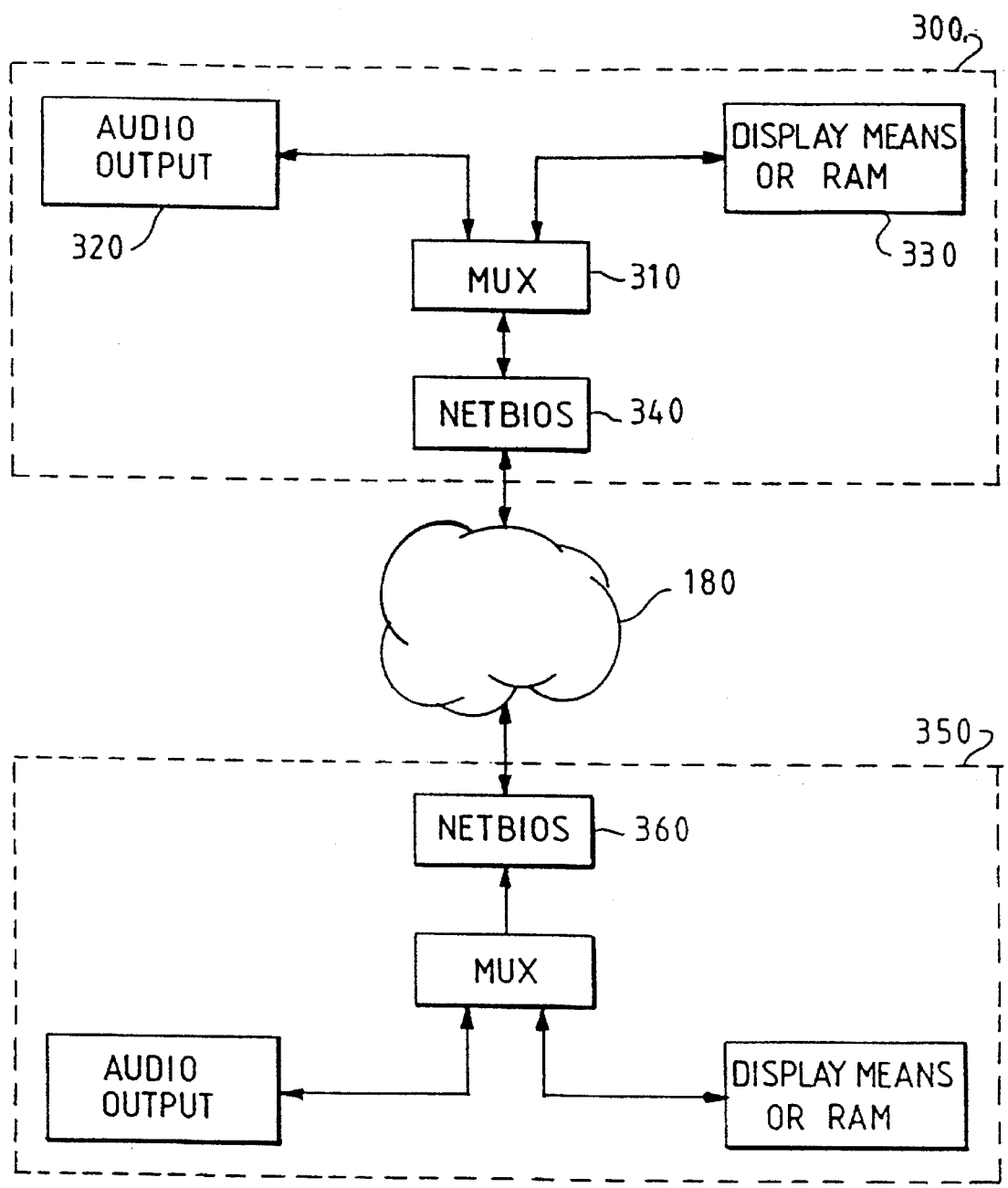
FIG. 3 illustrates schematically a communication terminal according to the present invention; and, FIG. 4 illustrates schematically a possible data packet structure containing data to be transmitted over a packet based data network according to the present invention.

In FIG. 3 there is shown schematically a communication terminal 300 according to the present invention having a multiplexer 310 for receiving digitised audio and pointer information from, say, a vocoder 320 and display means or memory 330 respectively and a netbios 340 for enabling communication over a packet based data network. The multiplexer 310 receives blocks of digitised audio from the vocoder 320 for incorporation into a data packet suitable for transmission over the packet based data network.

In an embodiment of the present invention described herein the blocks of digitised audio are produced at a rate of approximately fifty per second. Each block of digitised audio therefore corresponds to approximately twenty milliseconds of speech. As a conversation is generally not continuous, a further embodiment of the present invention can be realised in which the multiplexer 310 is speech responsive thereby multiplexing digital audio and pointer location data only upon detection of speech. The multiplexer 310 includes in each data packet for transmission the digitised audio block and the current pointer location co-ordinates.

The pointer location co-ordinates are appended to the end of the digitised audio block. The pointer location co-ordinate sampling rate is approximately twenty-five times per second. By including the pointer location co-ordinates in more than one packet the effects of lost packets can be mitigated. An addressee skilled in the art will appreciate that the sampling rate of the pointer location co-ordinates can be varied to either match the sampling rate of the digitised audio blocks thereby varying the synchronising between the audio and video or tailor the present invention in light of channel bandwidth restrictions.

Although an embodiment of the present invention described herein appends the pointer location co-ordinates to the end of the digitised audio block it is not limited thereto. It can equally well be implemented by using some other arrangement of pointer location co-ordinates and digitised audio block.

It will be appreciated that a microprocessor executing appropriate instructions can constitute a means for presenting to a multiplexer said digital audio and pointer location data units. It will be further appreciated by a skilled addressee that the multiplexer can be realised using either a microprocessor in conjunction with appropriate instructions or dedicated hardware and can constitute a means for multiplexing said presented digital audio and pointer location data units into the same packet for transmission over said packet based data network.

Although the embodiments of the present invention described herein utilise a multiplexer in order to construct a composite data packet, an addressee skilled in the art will appreciated that it is not limited to the same. It can equally well be implemented using some other means of arranging or incorporating the digitised audio and pointer location data units into the same data packet.

In order to ensure synchronisation between all of the addressor's articulations, drawing the addressee's attention to a particular aspect of the model, and the addressor's current pointer location the co-ordinates of the pointer are included in every data packet containing digitised speech sent to the addressee. It will be appreciated by one skilled in the art that notwithstanding the pointer co-ordinates being included in every data packet the present invention is not limited thereto. It can equally well be implemented using some other periodicity or regular interval.

At a receiving terminal 350, the composite data packet is received over the packet based data network 180. The netbios, 340 or 360, can constitute a means for receiving over a packet based data network from a remote terminal a composite data packet comprising multiplexed digital audio and pointer location data units. The composite data packet is demultiplexed into separate digitised audio and pointer location data units. An addressee skilled in the art will realise that a microprocessor executing appropriate instructions or dedicated hardware can constitute a means for demultiplexing said received composite data packet into separate digital audio and pointer location data units.

The digitised audio and pointer location data units are presented to the vocoder and display means respectively or other suitable device for subsequent output. It will be further appreciated by the skilled addressee that a microprocessor in conjunction with appropriate instructions can taken together provide a means for utilising said presented pointer location and digital audio data units to display a pointer reflecting the current location of a pointer on the display means of said remote terminal and to generate speech via said speech synthesis means thereby substantially synchronising the display of said pointer with the output of said digital audio from said remote terminal.

Referring to FIG. 4 there is shown schematically a composite data packet 400 according to the present invention, suitable for transmission over a packet based data network 180, comprising the conventional source and destination addresses, 410 and 420 respectively, digitised audio, 430, which has been digitised according to, say, CCITT Recommendation G.711 and the most recent pointer location co-ordinates, in terms of, say, ordinate and abscissa, 440 and 450. In the embodiments of the present invention described herein a total of four bytes are used to represent the co-ordinates of a pointer. The arrangement of the pointer location and digitised audio data units within the composite data packet is immaterial.

The composite data packet 400 when transmitted over the packet based data network 180 will be demultiplexed at a remote terminal. The various multi-media data therein will be extracted. The location of the copy of the other party's terminal pointer, as displayed on the remote terminal, will be updated prior to or substantially concurrently with the output of the decoded digital audio as a consequence of including the pointer location co-ordinates and the digitised audio in each composite packet thereby synchronising the output of the audio and pointer data.

It will be appreciated by one skilled in the art that exact temporal synchronisation of the output of the digitised audio and the pointer display is not necessary in order to obviate the problems addressed by the present invention. As a consequence of human factors, there is a tolerance within which the two outputs will be perceived by the parties as being substantially synchronised. For example, a lip-sync application may have a co-ordination interval of approximately ten to twenty milliseconds whereas a high speed photography application may have a tolerance of the order of microseconds.

Further, as many multi-media applications utilise the window facilities of, say, IBM's Presentation Manager[1] the pointer information has a high priority in terms of operations conducted with the system upon which an embodiment of the invention is realised. Consequently, it is likely that the pointer locations are updated prior to the output of digitised audio.

[1]IBM and Presentation Manager are trade marks of International Business Machines Corporation, Armonk, N.Y.

However, if the priority schemes indigenous to such window systems are insufficient to achieve adequate synchronisation an alternative embodiment of the present invention can be realised in which both the digitised audio and pointer display are both simultaneously latched to their respective output devices using a common latch signal under control of a microprocessor or other control unit.

It will be further appreciated by one skilled in the art that notwithstanding the present invention relating to the synchronisation of voice and pointer information within a video conferencing system, the teachings of the invention could equally well be utilised in any other packet based application requiring such synchronisation.

A communication terminal in accordance with the present invention advantageously provides synchronisation between audio output and pointer display.

Further, a transmitting communication terminal connected via a communication medium to a plurality of receiving communication terminals in accordance with the present invention may advantageously provide a one-to-many address system.

We claim:

1. A transmitting communication terminal comprising display means, means (320) for generating digital audio data units, an input means, means (330) responsive to said input means for generating pointer location data units and means (340) for transmitting a data packet over a packet based data network (180) to a remote terminal (350), said terminal comprising:

means for presenting to a multiplexer (310) said digital audio and pointer location data units; and means (310) for multiplexing said presented digital audio and pointer location data units into the same data packet thereby forming a composite data packet (400) for transmission over said packet based data network (180).

2. A receiving communication terminal comprising display means and further comprising:

means (340) for receiving over a packet based data network (180) from a remote terminal (350) a composite data packet (400) comprising multiplexed digital audio and pointer location data units;

means (310) for demultiplexing said received composite data packet (400) into separate digital audio and pointer location data units;

means for presenting said demultiplexed pointer location and digital audio data units to said display means and a speech synthesis means (320) respectively;

means for utilising said presented pointer location and digital audio data units to display a pointer reflecting the current location of a pointer on the display means of said remote terminal (350) and to generate speech via said speech synthesis means (320) thereby substantially synchronising the display of said pointer with the output of said digital audio from said remote terminal (350).

3. A communication terminal including display means, means (320) for generating digital audio data units, an input means, means (330) responsive to said input means for generating pointer location data units and means (340) for transmitting a data packet over a packet based data network (180) to a remote terminal, said terminal further comprising:

means for presenting to a multiplexer (310) said digital audio and pointer location data units; and means (310) for multiplexing said presented digital audio and pointer location data units into the same data packet thereby forming a composite data packet (400) for transmission over said packet based data network (180), means (340) for receiving over said packet based data network (180) from said remote terminal a composite data packet (400) comprising multiplexed digital audio and pointer location data units;

means (310) for demultiplexing said received composite data packet (400) into separate digital audio and pointer location data units;

means for presenting said demultiplexed pointer location and digital audio data units to said display means and a speech synthesis means (320) respectively; and means for utilising said presented pointer location and digital audio data units to display a pointer reflecting the current location of a pointer on the display means of said remote terminal and to generate speech via said speech synthesis means (320) thereby substantially synchronising the display of said pointer with the output of said digital audio from said remote terminal.

4. The terminal of claim 3 wherein said digitised audio and pointer location data units are taken from continuous data streams.

5. The terminal of claimed 4 wherein said multiplexing means (310) is responsive to speech detection.

6. The terminal of claim 2 wherein said means for utilising said presented pointer location and digital audio data units to display a pointer reflecting the current location of a pointer on the display means of said remote terminal and to generate speech via said speech synthesis means (320) further comprises means for loading said demultiplexed data units into appropriate registers within output devices and latching said data units utilising a common control signal.

7. The terminal of claim 5 wherein said means for utilising said presented pointer location and digital audio data units to display a pointer reflecting the current location of a pointer on the display means of said remote terminal and to generate speech via said speech synthesis means (320) further comprises means for loading said demultiplexed data units into appropriate registers within output devices and latching said data units utilising a common control signal.

8. A method of communicating sound and associated pointer information comprising the steps of generating digitised audio data units from the sound to be transmitted, generating pointer location data units representing the physical location of a pointer, said method being characterised by the steps of presenting to a multiplexer (310) said digital audio and pointer location data units; and multiplexing said presented digital audio and pointer location data units into the same data packet thereby forming a composite data packet (400) for transmission over a packet based data network (180).

9. A method of communicating sound and associated pointer information, comprising the steps of receiving over a packet based data network (180) from a remote terminal (350) a composite data packet comprising multiplexed digital audio representing sound transmitted from said remote terminal (350) and pointer location data units representing the physical location of a pointer on said remote terminal (350);

demultiplexing said received composite data packet into separate digital audio and pointer location data units;

presenting said demultiplexed pointer location and digital audio data units to said display means and a speech synthesis means (320) respectively; and utilising said presented pointer location and digital audio data units to display a pointer reflecting the current location of a pointer on the display means of said remote terminal (350) and to generate speech via said speech synthesis means (320) thereby substantially synchronising the display of said pointer with the output of said digital audio from said remote terminal (350).

10. A method of communicating sound and associated pointer information comprising the steps of generating digitised audio data units from the sound to be transmitted, generating pointer location data units representing the physical location of a pointer, said method comprising the further steps of presenting to a multiplexer (310) said digital audio and pointer location data units; and multiplexing said presented digital audio and pointer location data units into the same data packet thereby forming a composite data packet (400) for transmission over a packet based data network (180), receiving over said packet based data network (180) from a remote terminal a composite data packet (400) comprising multiplexed digital audio and pointer location data units;

demultiplexing said received composite data packet (400) into separate digital audio and pointer location data units;

presenting said demultiplexed pointer location and digital audio data units to said display means and a speech synthesis means (320) respectively; and utilising said presented pointer location and digital audio data units to display a pointer reflecting the current location of a pointer on the display means of said remote terminal and to generate speech via said speech synthesis means (320) thereby substantially synchronising the display of said pointer with the output of said digital audio from said remote terminal (350).

11. The method of claim 10 wherein said digitised audio and pointer location data units are taken from continuous data streams.

12. The method of claim 10 further comprising the step of loading said demultiplexed data units into appropriate registers within output devices and latching said data units utilising a common control signal.

* * * * *